No. 825,507. PATENTED JULY 10, 1906.
G. L. BAYLEY.
VALVE FOR FILTERS.
APPLICATION FILED MAY 3, 1905.

4 SHEETS—SHEET 2.

WITNESSES

INVENTOR
Guy L. Bayley
by James K. Bakewell
his attorney

No. 825,507.  
PATENTED JULY 10, 1906.  
G. L. BAYLEY.  
VALVE FOR FILTERS.  
APPLICATION FILED MAY 3, 1905.  
4 SHEETS—SHEET 3.

WITNESSES

INVENTOR  
Guy L. Bayley  
by James E. Botsuell  
his attorney

No. 825,507. PATENTED JULY 10, 1906.
G. L. BAYLEY.
VALVE FOR FILTERS.
APPLICATION FILED MAY 3, 1905.

4 SHEETS—SHEET 4.

WITNESSES

INVENTOR

UNITED STATES PATENT OFFICE.

GUY L. BAYLEY, OF PITTSBURG, PENNSYLVANIA, ASSIGNOR TO JOHN H. FERTIG, OF TITUSVILLE, PENNSYLVANIA.

VALVE FOR FILTERS.

No. 825,507.     Specification of Letters Patent.     Patented July 10, 1906.

Application filed May 3, 1905. Serial No. 258,703.

*To all whom it may concern:*

Figure 1:
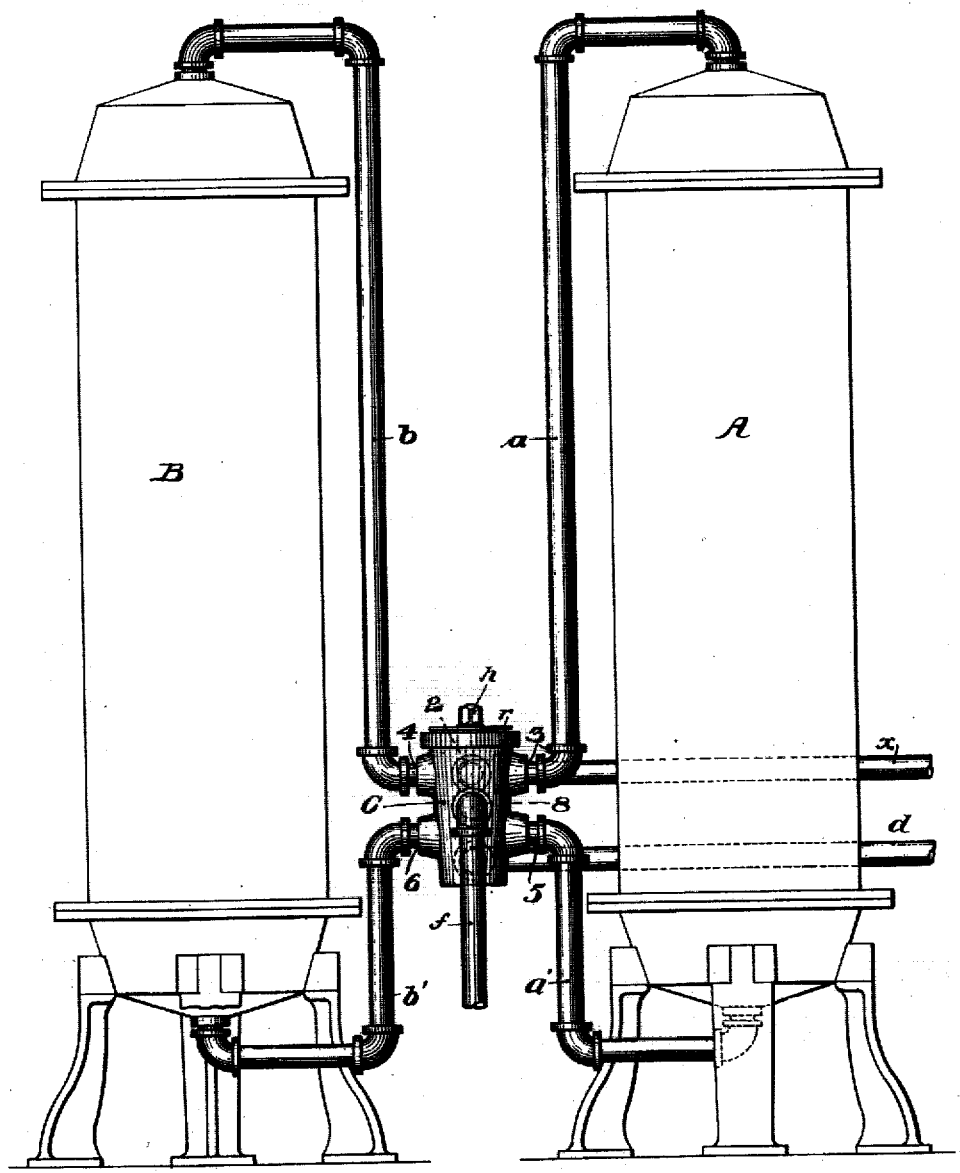
Figure 2:
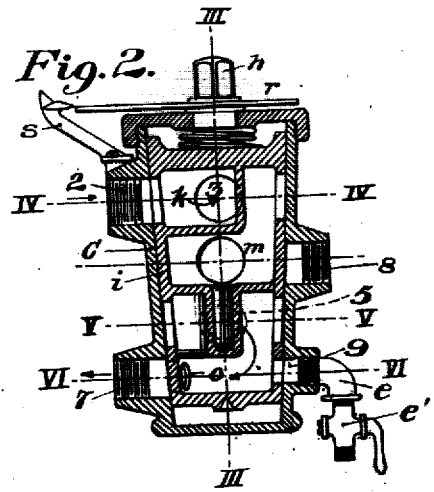
Figure 3:
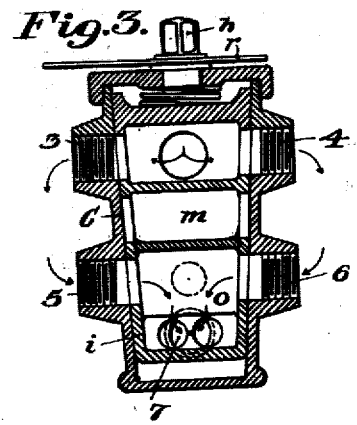
Figure 12:
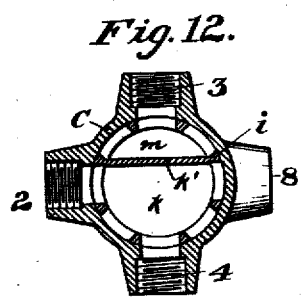
Figure 13:
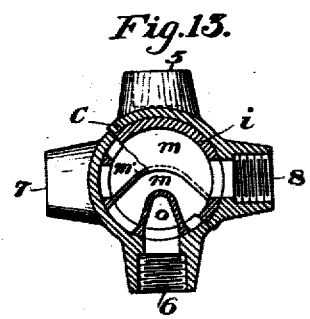
Figure 14:
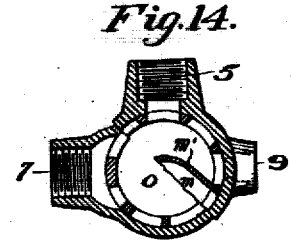
Figure 15:
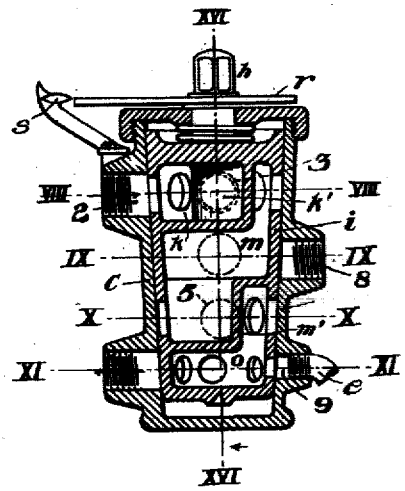
Figure 16:
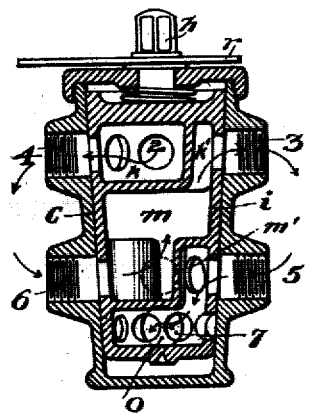
Figure 17:
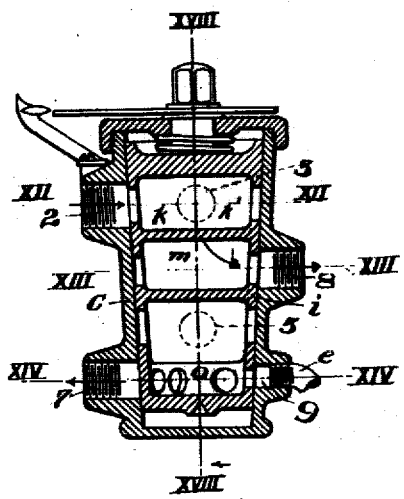
Figure 18:
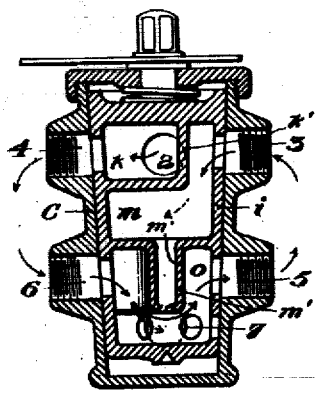

Be it known that I, GUY L. BAYLEY, of Pittsburg, in the county of Allegheny and State of Pennsylvania, have invented a certain new and useful Valve for Filters, of which the following is a full, clear, and exact description, reference being had to the accompanying drawings, forming part of this specification, in which—
Figure 1 is an elevation illustrating my improvement. Fig. 2 is a vertical sectional view of the valve, the parts being in position for single-filtering. Fig. 3 is a vertical sectional view on the line III III of Fig. 2. Figs. 4, 5, and 6 are horizontal sectional views on the lines IV IV, V V, and VI VI, respectively, of Fig. 2. Fig. 7 is a plan view of the dial for indicating the various positions of the valve-plug. Figs. 8, 9, 10, and 11 are horizontal sectional views of the valve on the lines VIII VIII, IX IX, X X, and XI XI, respectively, of Fig. 15, the parts being shown in each figure in position for double-filtering. Fig. 12 is a horizontal sectional view on the line XII XII of Fig. 17, the parts being in position for washing out one of the cylinders with filtered water from the other cylinder. Figs. 13 and 14 are horizontal sectional views, partly on the lines XIII XIII and XIV XIV, respectively, of Fig. 17, the parts in each figure being in position for washing out one of the cylinders with filtered water from the other cylinder. Fig. 15 is a vertical sectional view of the valve, the parts being in position for double-filtering. Fig. 16 is a vertical sectional view on the line XVI XVI of Fig. 15. Fig. 17 is a vertical sectional view of the valve, the parts being in position for washing the filter. Fig. 18 is a vertical sectional view on the line XVIII XVIII of Fig. 17.

Like symbols of reference indicate like parts wherever they occur.

My invention relates to a valve which may be used to control and direct the flow of a fluid through any one or through several of a number of filters in various directions.

Heretofore in the use of certain water-filters there has been disturbance of the filtering material whenever the direction of the flow of water through the filter has been changed in passing from single to double filtering, or vice versa, and this disturbance is not only injurious to the filter itself, but it also renders the filtering operation more or less imperfect.

The object of my invention is to provide a valve for making such changes in such a manner that the filtering material shall not be disturbed.

In Fig. 1 of the drawings I have shown my valve applied to a filter having two filtering-cylinders A and B, the filter being of that class in which the water passing to the filter through the raw-water-supply pipe *x* may be single-filtered—that is, caused to pass in two streams through the two pipes *a* and *b*, to and through the two filtering-cylinders A and B, and thence to the service-pipe *d*—or the water may be double-filtered—that is, it may be caused to pass from the supply-pipe *x* first through the cylinder A and then through the cylinder B before it passes to the service-pipe *d*, or vice versa. The filtering-cylinders A and B may be washed, either one, with filtered water from the other of the two cylinders, as by water passing from the supply-pipe *x* to the cylinder A and thence by the pipes *a'* and *b'* to the bottom of the cylinder B and through this cylinder to the waste-pipe *f*. The means by which these changes in the direction of the flow of the water is accomplished is the plug *i*, which may be turned to the desired position by a suitable wrench fitting on the squared end *h* thereof.

I will now describe my invention, so that others skilled in the art may manufacture and use the same.

In the drawings, Figs. 2 and 7, I show a dial *r*, so secured to the stem *h* of the plug that as the stem and plug of the valve rotate the dial rotates therewith. Fastened to the casing of the valve is a pointer or index-finger *s*. This dial is preferably marked at its middle tablet with the word "Single-filtering," which is the first or ordinary position of the valve. On one side of this middle tablet is a tablet marked "Double-filtering left to right," and on the other side of the single-filtering tablet is a tablet marked "Double-filtering right to left," which indicate the second positions of the valve. At the two ends of the dial and beyond the double-filtering tablets are tablets marked "Washing right hand" and "Washing left hand," which indicate the third positions of the valve. These tablets when brought opposite the pointer *s* show the position of the plug of the valve in the casing, such position being the proper one for the operation indicated on the tablet.

Figure 4:
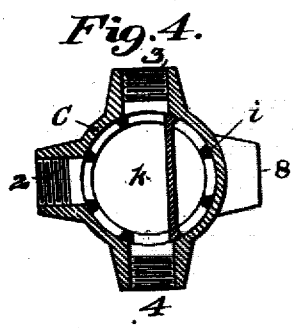
Figure 5:
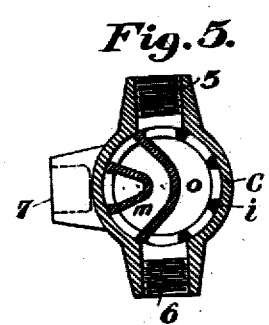
Figure 6:
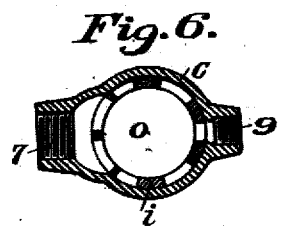
Figure 7:
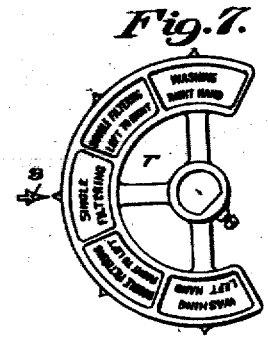
Figure 8:
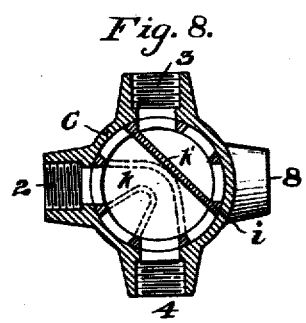
Figure 9:
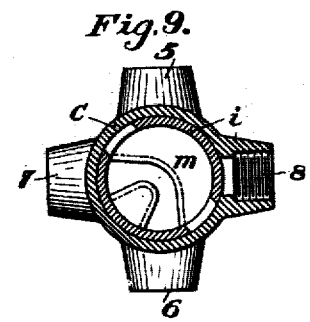
Figure 10:
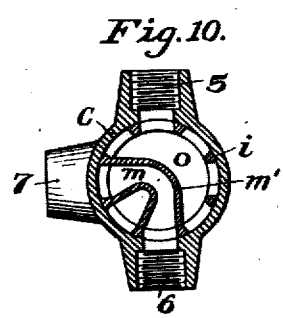
Figure 11:
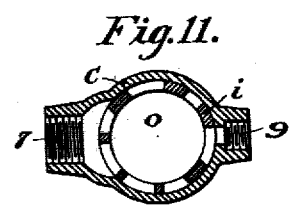

In Figs. 2 and 3, which are vertical sectional views of the valve, and in Figs. 4, 5, and 6, which are horizontal sectional views, I have shown the plug $i$ of the valve in its first position to single-filter the water—that is, the plug is in such position as to divide the water entering the valve-casing C from the supply-pipe $x$ into two streams, one stream passing to the cylinder A and the other stream passing to the cylinder B. The valve-casing C is provided with a supply inlet-port 2, which connects with the supply-pipe $x$; a supply outlet-port 3, which connects with the pipe $a$, leading to the cylinder A; a supply outlet-port 4, which is similar to the port 3 and connects with the pipe $b$, leading to the cylinder B; a discharge inlet-port 5, which connects with the pipe $a'$, leading to the valve from the bottom of the cylinder A; a discharge inlet-port 6, which is similar to the port 5 and connects with the pipe $b'$, leading to the valve from the bottom of the cylinder B; an outlet-port 7, that connects with the service-pipe $d$, and a washing or waste port 8, that connects with the waste-pipe $f$.

The plug $i$ of the valve is provided with certain channels which may be brought into communication with the several ports in the casing by turning the plug on its axis. In the position of Figs. 2, 3, 4, 5, 6, and 7, which is the first position for single-filtering, the supply inlet-port 2 is in communication with the supply-pipe $x$ and the supply outlet-ports 3 and 4 are in communication with the pipes $a$ and $b$ and an open channel $k$, formed in the plug $i$ between the port 2 and the ports 3 and 4, thus permitting the water to pass from the supply-pipe $x$ to both cylinders A and B. After passing through the filtering material in the cylinders A and B the water passes from the cylinders through the pipes $a'$ and $b'$ to the discharge inlet-ports 5 and 6 in the valve-casing and thence through the open channel $o$ to the discharge outlet-port 7, which is in communication with the service-pipe $d$.

The plug $i$ is provided with three separate channels—$k$, the upper channel, which directs the flow of water from the supply-pipe $x$ in filtering; $o$, the lower channel, which directs the flow of water to the service-pipe $d$, and $m$, the middle channel, which directs the flow of dirty water in washing out the cylinders and also the single-filtered water in double-filtering.

In Figs. 8, 9, 10, 11, 15, and 16 the valve is shown in one of its positions for the purpose of double-filtering, the port 2 being in communication with the supply-pipe $x$, and by means of the channel $k$ it is in communication with the port 4 and pipe $b$, leading to the cylinder B; but it is cut off from the pipe $a$ and cylinder A by the vertical wall $k'$ of the channel $k$. This causes all of the water from the supply-pipe $x$ to pass to the cylinder B. The port 6 is also in communication with the pipe $b'$ and with the channel $m$. This channel $m$ is cut off from the ports 5 and 7 by the vertical wall $m'$; but it is in communication with the port 3, and the filtered water from the cylinder B is thereby caused to pass through the port 3 and pipe $a$, to the filtering-cylinder A. The port 5 is in communication with the channel $o$, and the double-filtered water from the cylinder A passes through the pipe $a'$ into the channel $o$ and from this channel through the port 7 to the service-pipe $d$.

In Figs. 12, 13, 14, 17, and 18 I show the valve in one of its third positions for the purpose of washing one of the cylinders with filtered water from the other cylinder, the port 2 being in communication with the supply-pipe $x$ and the channel $k$, the channel $k$ being in communication with the port 4 and shut off from the port 3 by the vertical wall $k'$. The water from the supply-pipe $x$ passes into the cylinder B and through the same into the pipe $b'$ in the manner already described. The port 6 is in communication with the pipe $b'$ and also with the channel $o$, which channel is in communication with the port 5 and also with the port 7. Part of the filtered water from the cylinder B passes through the channel $o$ to the port 7 and service-pipe $d$ and part passes from the channel $o$ to the port 5 and pipe $a'$ and thence through the cylinder A from bottom to top, washing the filtering material with filtered water. The port 3 is also in communication with the channel $m$, and as the waste water passes from the cylinder A through the pipe $a$ to the valve-casing C it enters the port 3, passes through the channel $m$ to the port 8, and through this port to the waste-pipe $f$. This operation washes either of the cylinders with water from the other without interfering with the supply of filtered water to the service-pipe $d$. Although I have mentioned the plug $i$, this plug is in reality a shell having walls to form channels. This construction enables the partition to be of such form and thickness as to prevent liability of leakage. At the lower portion of the valve-casing C is a port 9 and pipe $e$, the port opening into the channel $o$. This pipe $e$ is provided with a faucet $e'$. By means of these parts the valve C may be drained.

The operation of double-filtering and of washing may of course be reversed—that is, the water may be caused to pass first through the cylinder A and then through the cylinder B in double-filtering; and in washing, the filtered water from the cylinder A may be used to wash the cylinder B by moving the valve-plug to the left of the single-filtering position instead of to the right.

I have given the several ports names in accordance with their functions in single-filtering, and these names have been retained throughout the specification and claim, although the function may be different in the several positions of the valve.

The advantages of my invention result from the construction that enables the valve to be moved from single-filtering position to double-filtering in either direction without passing through the washing position, also from the construction of the plug that allows the water to pass through the various channels without liability of leakage, and also from the location and connections of the channels and ports that result in a decrease of friction.

I claim—

The combination of two filtering-chambers; a valve-chamber having a supply inlet-port connected to the raw-water-supply pipe, two supply outlet-ports connected to said filtering-chambers, two discharge inlet-ports also connected to the filtering-chambers, a discharge outlet-port leading to the service-pipe, and a washing or waste port; and a plug adapted to said valve-chamber and provided with channels and ports adapted in the first or single position of the plug to connect said supply inlet-port with said two supply outlet-ports and said two discharge inlet-ports with said discharge outlet-port; in the second or double-filtering positions of the plug to connect the supply inlet-port with the supply outlet-port leading to one filtering-chamber and the discharge inlet-port of said filtering-chamber to the supply outlet-port of the other filtering-chamber, and the discharge inlet-port of said last-named filtering-chamber with the discharge outlet-port leading to the service-pipe; and in the third or washing positions of the plug to connect the discharge inlet-port of one filtering-chamber with the discharge inlet-port of the other filtering-chamber, and the supply outlet-port of said last-named filtering-chamber with the waste-channel and waste-port; substantially as described.

In testimony whereof I have hereunto set my hand.

GUY L. BAYLEY.

Witnesses:
 MARGARET C. KUTH,
 JAMES K. BAKEWELL.